US007957018B2

(12) United States Patent
Rudolph et al.

(10) Patent No.: US 7,957,018 B2
(45) Date of Patent: Jun. 7, 2011

(54) COVERSHEET MANAGER APPLICATION

(75) Inventors: Craig Anthony Rudolph, Shelbyville, KY (US); John S. Steele, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1203 days.

(21) Appl. No.: 11/149,996

(22) Filed: Jun. 10, 2005

(65) Prior Publication Data

US 2006/0279798 A1 Dec. 14, 2006

(51) Int. Cl.
*G06F 3/12* (2006.01)
(52) U.S. Cl. ............ 358/1.15; 358/1.13; 358/1.18; 358/403; 358/407; 358/453; 707/200
(58) Field of Classification Search ........... 358/1, 403, 358/407, 453, 1.13–1.18; 707/200
See application file for complete search history.

(56) References Cited

U.S. PATENT DOCUMENTS

| 6,426,806 | B2 * | 7/2002 | Melen ..................... 358/468 |
| 6,473,203 | B1 | 10/2002 | Hisatomi et al. |
| 6,665,086 | B2 * | 12/2003 | Hull et al. ............... 358/1.15 |
| 6,742,161 | B1 * | 5/2004 | James et al. ............. 715/205 |
| 7,458,612 | B1 * | 12/2008 | Bennett .................... 283/81 |
| 7,561,287 | B1 * | 7/2009 | Antonacci et al. ........ 358/1.15 |
| 2002/0023057 | A1 * | 2/2002 | Goodwin et al. ............ 705/50 |
| 2002/0080387 | A1 * | 6/2002 | Grasso et al. ............. 358/1.15 |
| 2002/0122202 | A1 * | 9/2002 | Nagashima ............... 358/1.15 |
| 2004/0088378 | A1 | 5/2004 | Moats |
| 2004/0205466 | A1 * | 10/2004 | Kuppinger et al. ........ 715/500 |
| 2006/0013220 | A1 | 1/2006 | Niikura |
| 2006/0238822 | A1 * | 10/2006 | Van Hoof .................. 358/402 |
| 2006/0282463 | A1 * | 12/2006 | Rudolph et al. .......... 707/104.1 |

* cited by examiner

Primary Examiner — Chan S Park

(57) ABSTRACT

A method, and a system using the method, of managing and using a profile to be associated with a document. The method includes generating an identifier based on the profile and printing the identifier for use in scanning documents to be associated with the profile.

16 Claims, 15 Drawing Sheets

COVERSHEET MANAGER APPLICATION

CROSS REFERENCES TO RELATED APPLICATIONS

This patent application is related to the U.S. patent application Ser. No. 11/055,875, filed Feb. 11, 2005, entitled "System and Method of Importing Documents into Document Management System" and U.S. patent application Ser. No. 11/149,582, filed Jun. 10, 2005, entitled "Virtual Coversheet Association Application," both of which are assigned to the assignee of the present application.

BACKGROUND

Embodiments of the invention relate to a method and system for managing scanned documents.

In order to save a scanned document on a network, a user generally has to provide a profile of information relating to the scanned document. The profile is essentially a set of information relating to the document and can include the name of the profile, the author of the scanned document, a library to which the scanned document belongs, a client number, a matter number, the name of the scanned document, the type of the scanned document, and a file format of the scanned document. To enter all the profile information, the user generally logs in to the computer network, and enters the profile information through the computer or through a multi-function device ("MFD") or other device on the network. Entering the information can be time consuming. Furthermore, entering profile information for repetitive batch jobs where the same profile is used for multiple documents can be tedious.

After the scanned document has been profiled, the user can save the scanned document based on information provided in the profile. In this way, the user can associate the information in the profile with the scanned document and be able to retrieve the scanned document using the information in the profile. The user can link the document to email, fax, and other functions that a corresponding database or document management system offers. Typically, additional thick or fat client software applications have to be installed on the computer. However, the additional thick or fat client software applications, depending on functions and capability offered, can require a lot of overhead, exhaust computer memory, and consume large amounts of processing time.

SUMMARY

Some existing software applications allow the user to enter the profile on a computer. However, these software applications often require a large amount of memory and entering the information can be tedious and time consuming. Embodiments of the present invention can simplify the process of manipulating information in a profile of a document to be scanned at an MFD in a network setting. For example, a user can generate at a computer a physical coversheet with the profile information, load the coversheet and the document to be scanned at the MFD, and scan the document together with the coversheet at the MFD. The scanned document is subsequently exported from the MFD to a database according to the profile information provided on the coversheet. In another example, the user can generate a virtual coversheet, load the document to be scanned at the MFD, select the virtual coversheet to be used and scan the document at the MFD. The virtual coversheet is then associated with the scanned document. The scanned document is subsequently exported from the MFD to the database or document management system according to the information on the coversheet.

In one form, the present invention provides a method of managing and using a profile to be associated with a document. The method includes generating an identifier based on the profile and printing the identifier for use in scanning documents to be associated with the profile.

In another form, the present invention provides a method of managing a document. The method includes accessing at least one of an existing profile and a new profile. Based on the accessed profile, the method includes generating an identifier and printing the identifier for use in scanning documents to be associated with the profile.

In yet another form, the present invention provides a system for managing and using a profile to be associated with a document. The system includes an application configured to generate an identifier based on the profile and a device configured to print the identifier for use in scanning documents to be associated with the profile.

Other aspects of the invention will become apparent by consideration of the detailed description and accompanying drawings.

DETAILED DESCRIPTION

Figure 1:
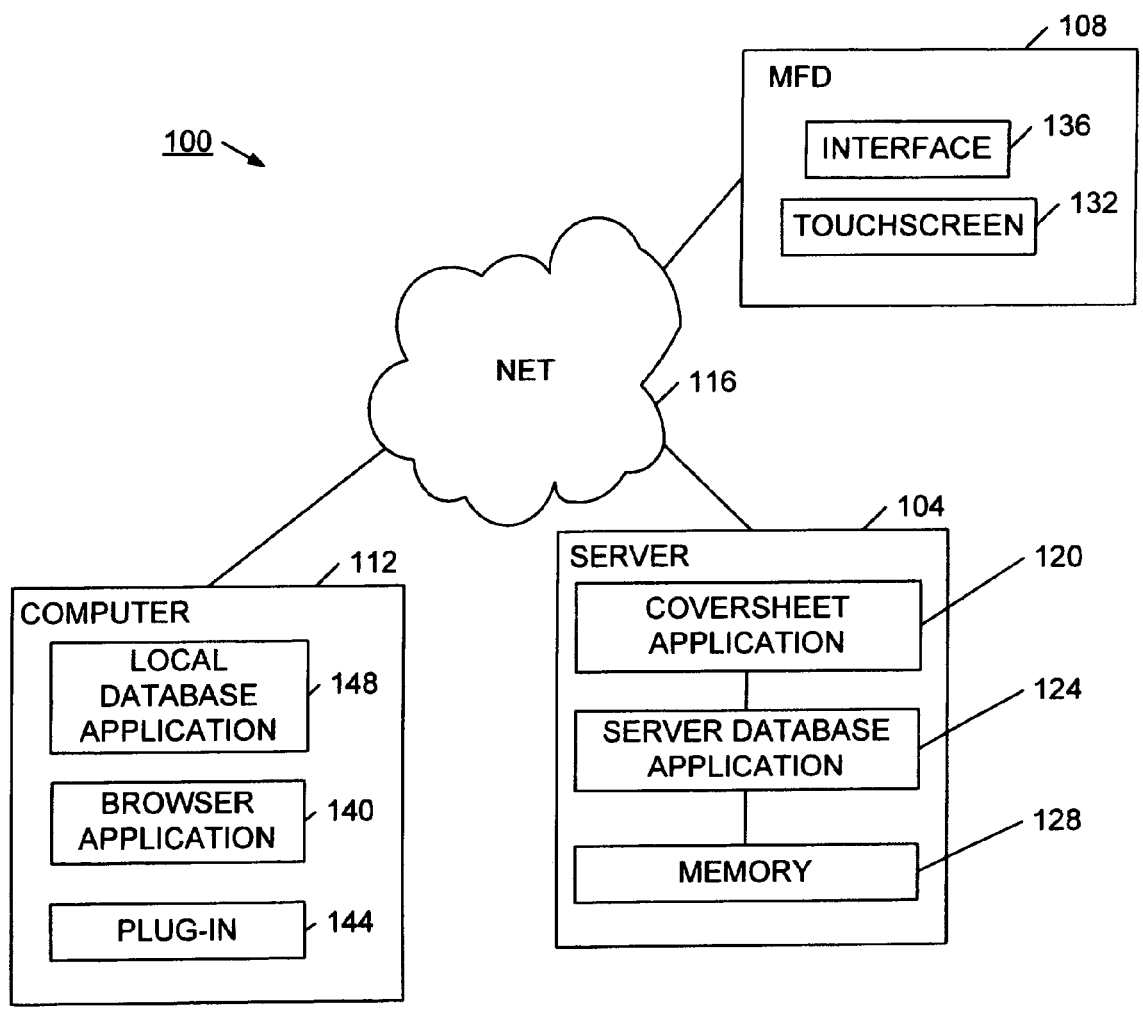
FIG. 1 is an illustration of electronic data management system.

Before any embodiments of the present invention are explained in detail, it is to be understood that the present invention is not limited in its application to the details of construction and the arrangement of components set forth in the following description or illustrated in the following drawings. The present invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As should also be apparent to one of ordinary skill in the art, the systems shown in the figures are models of what actual systems might be like. Many of the modules, applications, and logical structures described are capable of being implemented in software executed by a microprocessor or a similar device or of being implemented in hardware using a variety of components including, for example, application specific integrated circuits ("ASICs"). Terms like "processor" may include or refer to hardware, software or a combination thereof. Furthermore, throughout the specification capitalized terms are used. Such terms are used to conform to common practices and to help correlate the description with the coding examples, equations and/or drawings. However, no specific meaning is implied or should be inferred simply due to the use of capitalization. Thus, unless specifically indicated otherwise, the claims should not be limited to the specific examples or terminology or to any specific hardware or software implementation or combination of software or hardware.

Embodiments of the present invention relate to a method and system for managing a scanned document or scanned images acquired or generated using a conventional scanner, or a multi-function device ("MFD") capable of any combination of scanning, faxing, copying, or printing functions. In one embodiment, the system includes a web browser that is accessible at a desktop computer and that is integrated with a database or document management system such as Hummingbird Document Management or Worldox. The web browser includes a login screen that prompts a user to login to the database or document management system. In one specific embodiment, the user generates or prints a barcode coversheet. The user then places the barcode coversheet on top of a document to be scanned, and places the barcode coversheet and the document to be scanned at the MFD. Once the MFD has scanned in the barcode coversheet and the document, the scanned document can be directed within the database management system.

FIG. 1 shows a digital destination system, such as an electronic database management system 100 that includes a server 104, a scanning device, such as MFD 108, and a computer 112 all coupled together via a network 116. In the embodiment shown, the server 104 includes a coversheet application 120, a server database application 124, and a memory 128, among other things. The MFD 108 includes a touch screen application or a touch screen 132 that communicates with the network 116 through an interface application 136 in the MFD 108. The computer 112 includes a browser application 140, a local coversheet application or plug-in 144, and a local database application 148 that accesses information in the server database application 124. Operations of the electronic data management system 100 are discussed in detail below. Although the system 100 shows only one computer 112, one server 104 and one MFD 108, the system 100 can have any number of computers and MFDs on the system. The MFD can be capable of performing any combination of scanning, faxing, copying, or printing functions. Furthermore, although the MFD 108 is shown using the touch screen application or the touch screen 132, the MFD 108 can also use a keypad mouse, or other input device and a display to accomplish similar functions through graphical user interfaces displayed on the display. In alternate embodiments, the digital destination system may be an electronic document system, and the scanning device may be a conventional stand-alone scanner.

Figure 2:
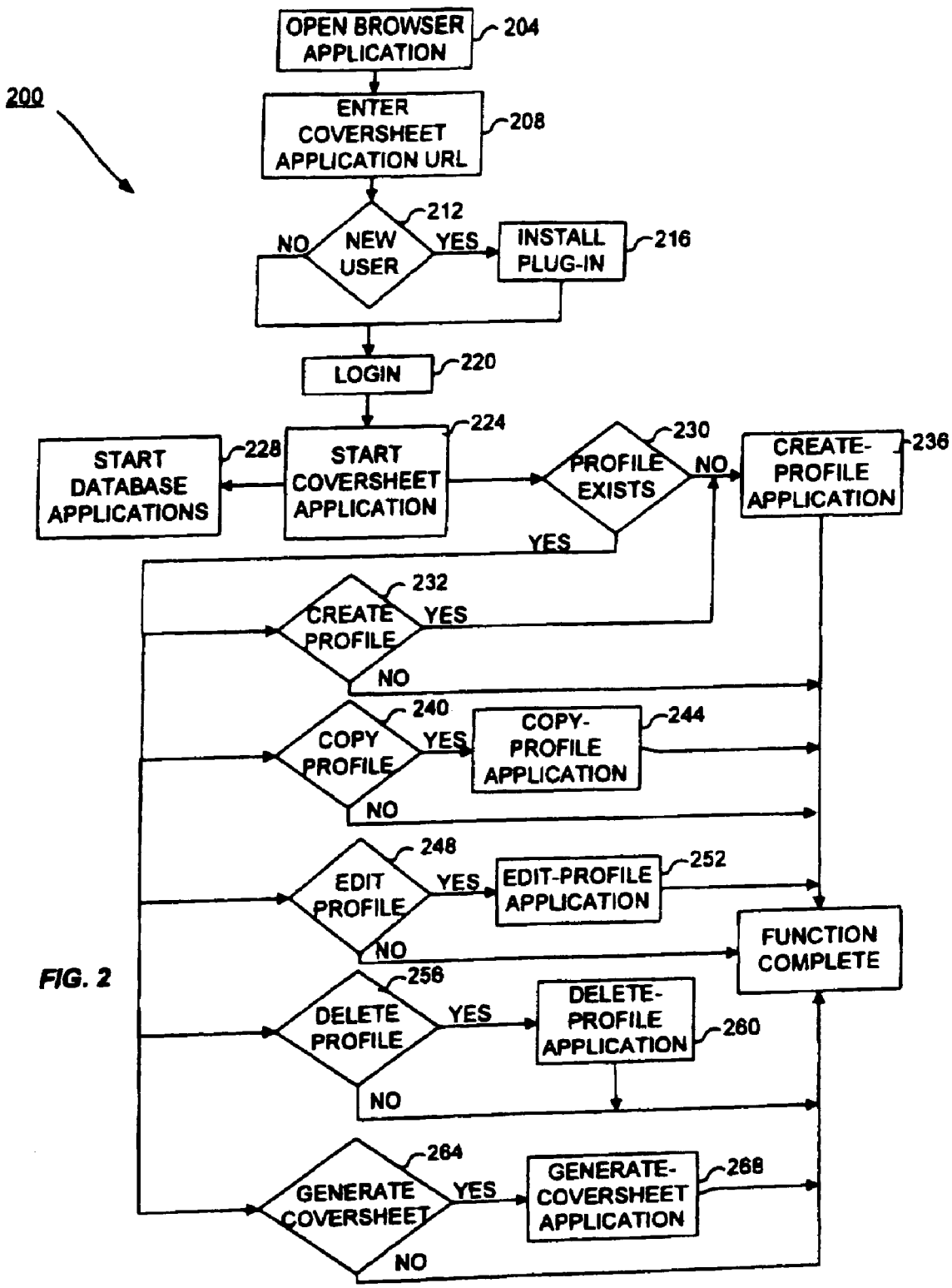
FIG. 2 is a flow chart that illustrates system processes of the system of FIG. 1.

FIG. 2 includes a flow chart 200 that further illustrates processes that occur in some embodiments including processes that may be carried out by software, firmware, hardware or any combination thereof. Particularly, a user can use the browser application 140 through the Internet or any other network to access or process information from remote locations such as the computer 112. At block 204, the user opens the web browser application 140. At block 208, the user enters or provides the Internet address or uniform resource locator ("URL") of the coversheet application 120. A processor or a controller either at the computer 112 or at the server 104 determines if the user is a new user. If it is determined that the user is a new user at block 212, the process 200 remotely installs the coversheet application plug-in 144 at block 216. After the process 200 has determined that the user is not a new user or after the plug-in 144 is installed at block 216, a log-in process is performed at block 220. In some embodiments, the log-in process at block 220 includes entering a user ID of the user. In other embodiments, the log-in process at block 220 may include prompting the user for a password or some other security identification for access to the server database application 124 or the local database application 148. Although it is not explicitly discussed herein, it should be understood that the log-in process at block 220 can include other processes or routines. Furthermore, although not shown in the log-in process at block 220, it should also be understood that if a password or other security identification is required, such password or other security identification can also be communicated to the server 104. In this way, the server 104 can verify the password or other security identification, if desired.

Once the user has successfully logged in at block 220, a home page of the coversheet application is shown or displayed at block 224. At block 228, both the local database application 148 and server database application 124 may be also be launched or started in a known manner. At block 230, the coversheet application determines whether a profile is already saved on the system 100. If it is determined that there are no currently saved profiles, a profile may be created at block 236.

Once at least one profile exists, a user may elect to create another profile. As shown in FIG. 2, the coversheet application determines if the user desires to create a new profile at block 232. If it is determined that a new profile is to be created, the create profile application is started or launched at block 236.

Once at least one profile exists, a user may elect to perform one or more functions on the existing profile. For example, at block 240, the coversheet application determines whether the user selections received is to copy a profile. If it is determined that a profile is to be copied, the copy-profile application is executed at block 244. At block 248, the coversheet application determines whether the user selection received is to edit a profile. If it is determined that a profile is to be edited, the edit-profile application is executed at block 252. The coversheet application may also determine whether a profile is to be deleted (block 256). If it is determined that a profile is to be deleted, a delete-profile application is executed at block 260. At block 264 the coversheet application determines whether the user selection received is to generate a coversheet. If it is determined that a coversheet is to be generated, the generate coversheet application is executed at block 268. The determination of what function the user wants to perform may occur in any order and may occur simultaneously or sequentially.

The profile information or metadata may be stored in any computer readable format. In some embodiments, the information of the profile may be encoded and stored in a database.

Figure 3:
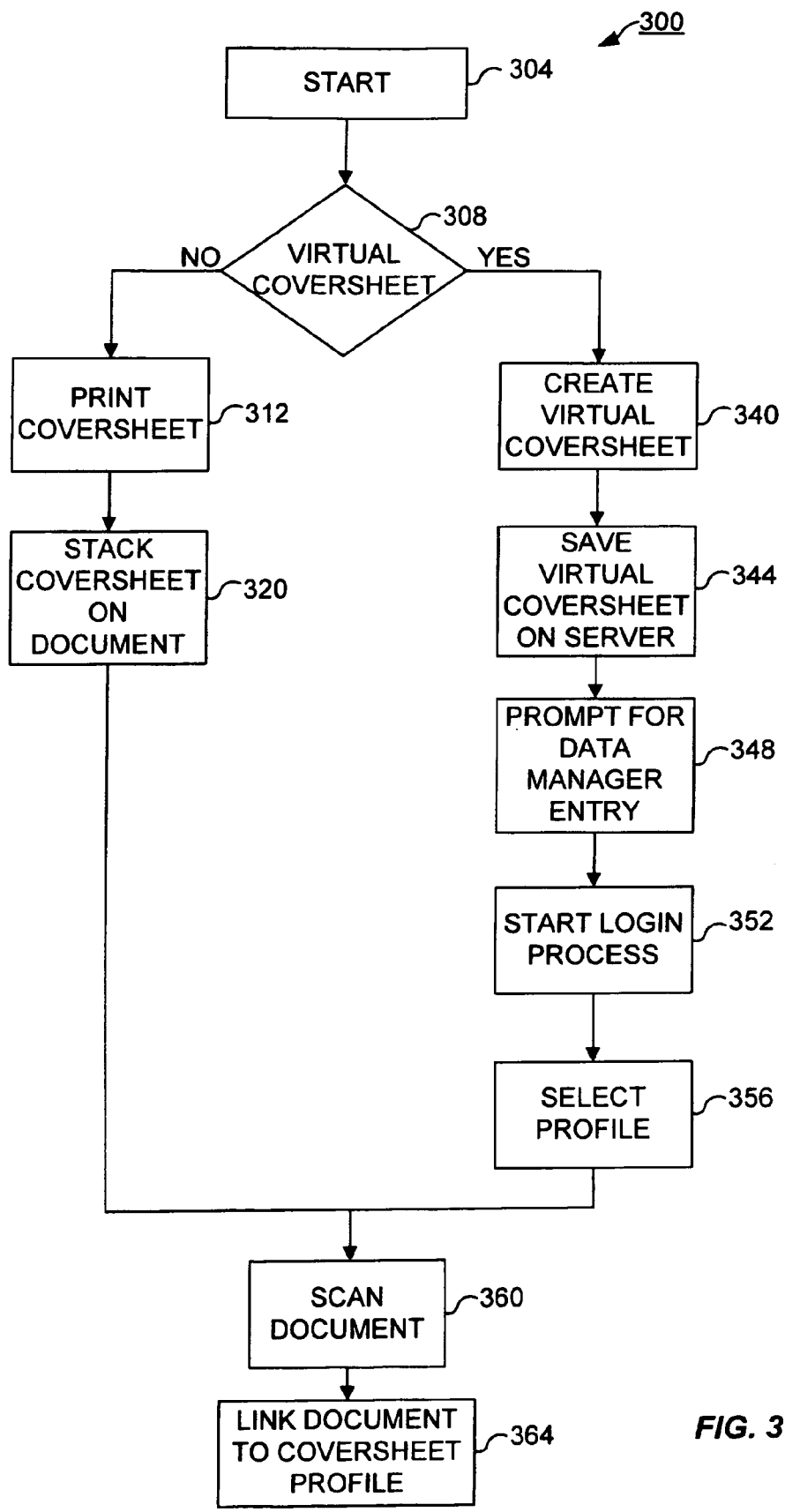
FIG. 3 is a flow chart that illustrates an exemplary coversheet application process.

FIG. 3 includes a flow chart that illustrates an exemplary coversheet process 300 as described in connection with block 268 of FIG. 2. The coversheet process 300 starts at block 304, and determines whether a virtual coversheet is needed at block 308. In some embodiments, the determination of whether a virtual coversheet is needed at block 308 includes determining whether selected hardware such as a specific model of MFD, a selected brand of MFD, an MFD that offers a specific function, an MFD that meets a specific specification, and the like, is being used in association with the system 100 (of FIG. 1). For example, if the selected hardware is used with the system 100, the coversheet process 300 can be configured to generate a virtual coversheet at block 308. However, if the selected hardware is not being used with the system 100, the coversheet process 300 can be configured to generate a physical coversheet instead.

If it is determined at block 308 that the coversheet process 300 is to generate a physical coversheet, a coversheet is printed at block 312. The user can then stack the printed coversheet on a document to be scanned at block 320. Although the printed coversheet is described as being stacked on top of the document to be scanned at block 320, the printed coversheet can also be placed in any other position in the document. In such cases, the coversheet is formatted such that when the document is scanned, the MFD 108 can read and recognize the coversheet regardless of the coversheet position.

If it is determined at block 308 that a virtual coversheet can be generated, a virtual coversheet is created at block 340. In some embodiments, the virtual coversheet can be an electronic image, electronic data, or an electronic hook that includes the metadata of the document to be scanned. At block 344, the virtual coversheet generated at block 340 is stored or saved on the server 104 and may be accessible from other locations. At block 348, the coversheet process 300 prompts the user for a selection of a server database application to be used with the virtual coversheet. At block 352, another log-in process is performed at the MFD 108 to validate or authenticate the user's identity. After a successful login, the user selects a profile with which the document to be scanned is associated (block 356). It should be noted that the log-in process at block 352 can be similar to the log-in process at block 220 of FIG. 2. However, other log-in processes can also be used. Furthermore, it should also be noted that in addition to the log-in process at 352, other verification processes may be performed simultaneously with the log-in process at block 352. In some embodiments, selecting a profile at block 356 can be skipped. For example, if the coversheet process 300 allows only a particular type of profile, selecting a profile at block 356 may not be necessary.

Thereafter, the document to be scanned is scanned by the MFD 108 at block 360. In a case where a virtual coversheet has been generated, only the document to be scanned is scanned in at block 360. In a case where a physical coversheet has been generated, scanning the document at block 360 includes scanning in the printed coversheet and the document to be scanned. Once the document has been scanned at block 360, the coversheet process 300 links the scanned document to the information provided in the coversheet or the metadata at block 364. In some embodiments, the information on the coversheets, whether virtual or physical, includes the information of the profile selected by the user. The information may include a client number, client name, matter number, matter name, folder name, folder number, description, file format, and name of the profile. Other information may also be included with the profile information depending upon the desires of the user or needs of the system 100.

Figure 4:
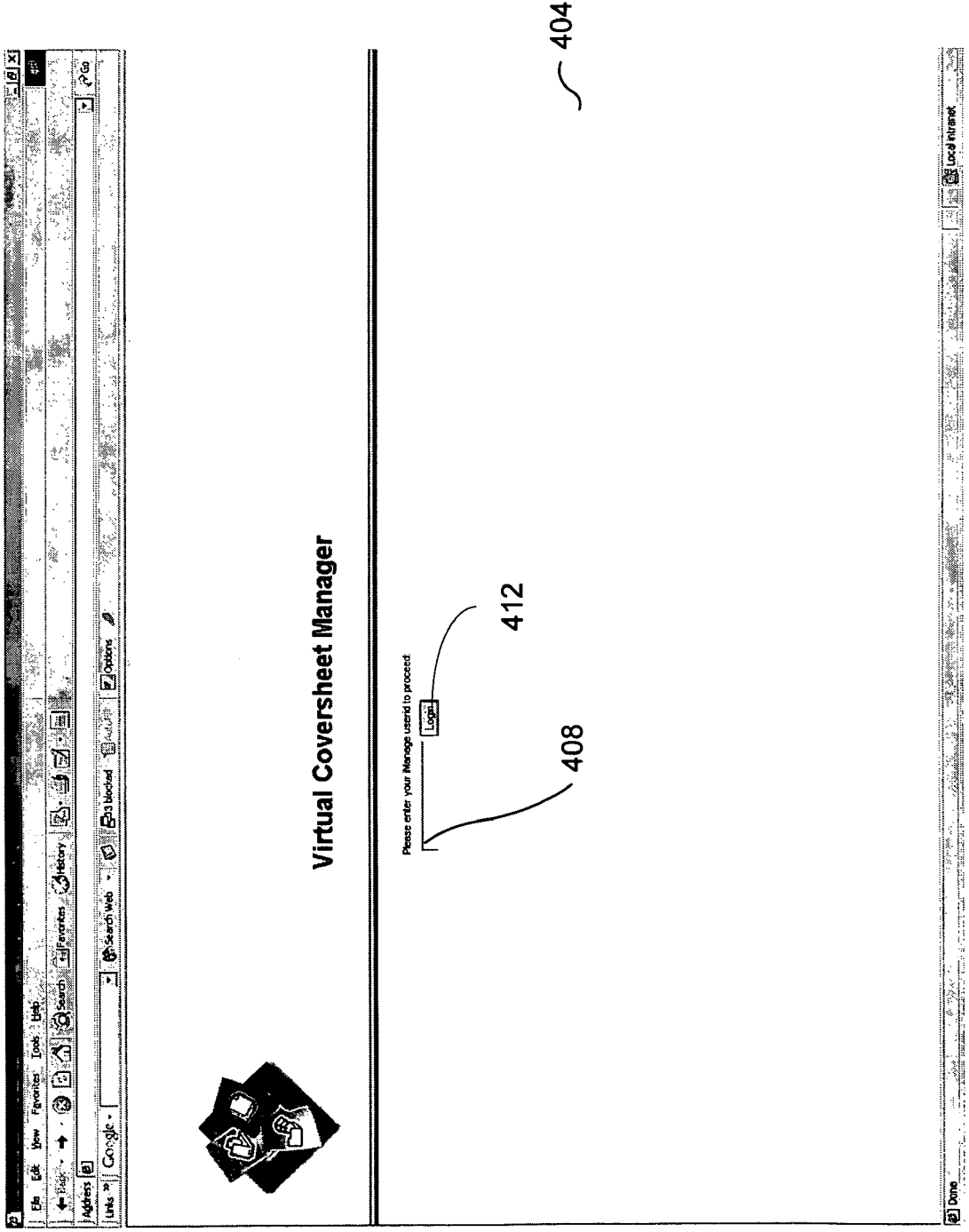
FIG. 4 is a first web browser screen display of the coversheet application of FIG. 3 showing a login page.

To access information from locations and devices such as the computer 112, the user can use the web browser application 140 and the plug-in 144 to access the information and data stored in the memory 128 that is organized and managed by the database application 124 via the coversheet application 120. For example, the user may be authenticated by the server 104 via the browser application 140 to access information on a server 104, in a known manner. FIG. 4 is a first web browser screen display 400 of the coversheet application 120 of FIG. 1. The first web browser screen display 400 particularly shows a login page 404 that can include a user identification entry 408 and a login button 412. In other embodiments, the login page 404 can also include other information entries such as a password entry.

Figure 5:
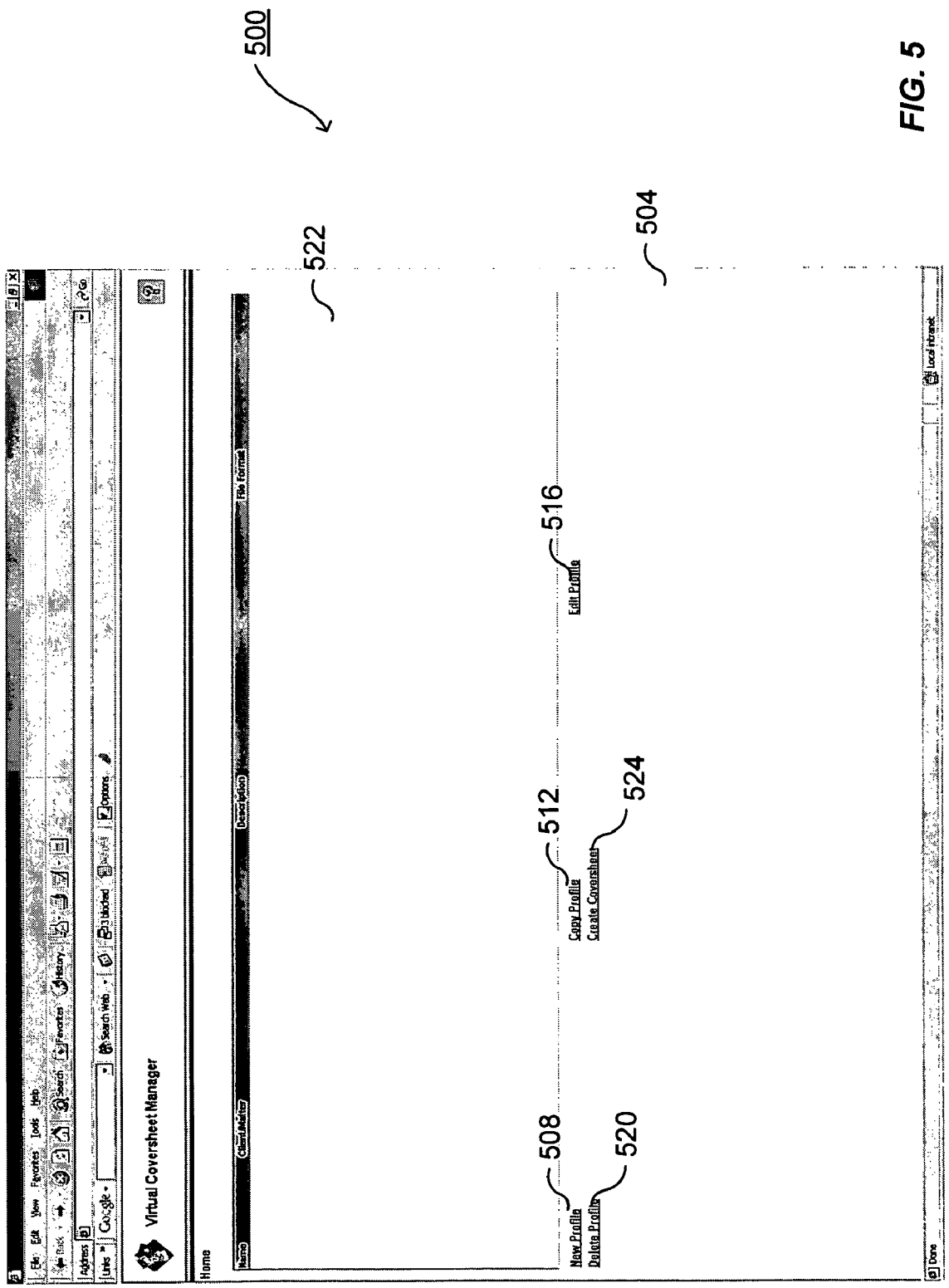
FIG. 5 is a second browser screen display of the coversheet application of FIG. 3 showing a blank home page for a new user.

FIG. 5 is second browser screen display 500 of the coversheet application 120. Once the user has successfully logged in at the login page 404, the plug-in 144 starts to interact with the coversheet application 120 and a home page 504 may be displayed at the second web browser screen display 500. The home page 504 may include a plurality of options or links that can be configured or preprogrammed. In the embodiment shown, the options, which are depicted as links, include creating a new profile 508, copying a profile 512, editing a profile 516, deleting a profile with 520, and creating a coversheet 524. Operations of the option links 508, 512, 516, 520, 524, are discussed below.

The home page 504 includes a profile area 522. As shown, the profile area 522 does not include any profile in order to show that it is the first time a particular user has successfully logged into the coversheet application 120 with the plug-in 144. However, in other embodiments, the home page 504 can include a number of default profiles predetermined or offered by the coversheet application 120 or the server database application 124. The home page 504 may also include profiles previously created by the user. In some embodiments, a maximum number of profiles can be displayed with the home page 504. Generally, the maximum number of profiles that can be displayed on the home page 504 is configurable by the user or system administrator. In the embodiment shown in FIG. 5, the maximum number of profiles allowed is five. In such cases, if a user decides to create a sixth profile, an error pop up window may be displayed to alert the user that the maximum number of profiles allowed has been reached. In some embodiments, the user may be allowed to delete a profile using the link 520 before adding a new profile with the link 508.

Figure 6:
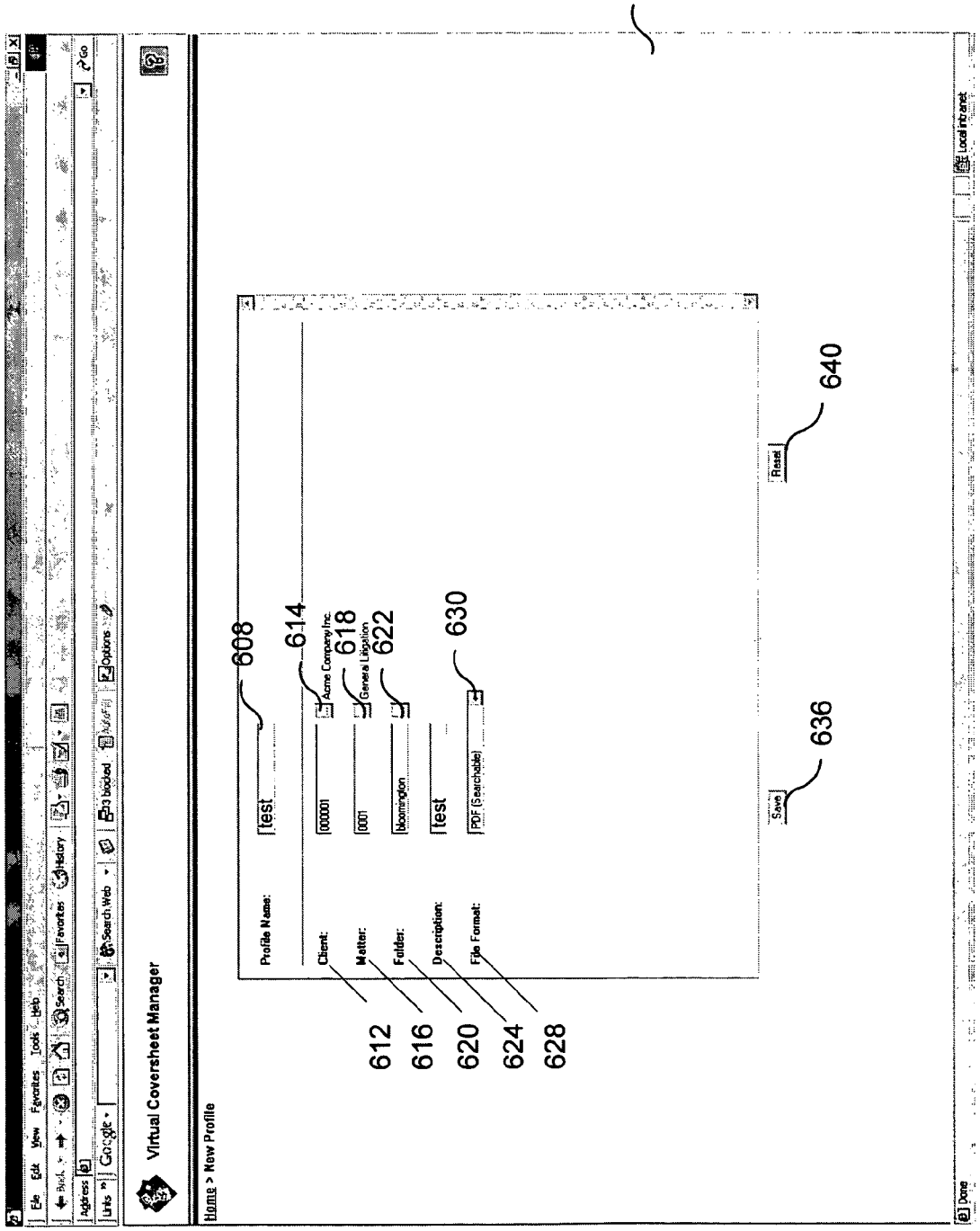
FIG. 6 is third web browser screen display of the coversheet application of FIG. 3 showing a plurality of profile fields.

If the user decides to create a new profile from the home page 504, the user can select or click the new profile link 508 to create a new profile. FIG. 6 is a third web browser screen display 600 that includes a new profile page or screen 604. In the embodiment shown, the new profile screen 604 includes a plurality of profile fields. The profile fields include a profile name 608 that the user may select from the local database application 148 or server database application 124 (of FIG. 1). The user may also be prompted to manually enter a profile name at profile name field 608. The user may also have to enter other information for other fields. Such other information fields may include, for example, client information field 612, a matter field 616, a folder field 620, a description field 624, and a selectable file format field 628. The system administrator may create fields and/or prompts for other categories of information.

Figure 7:
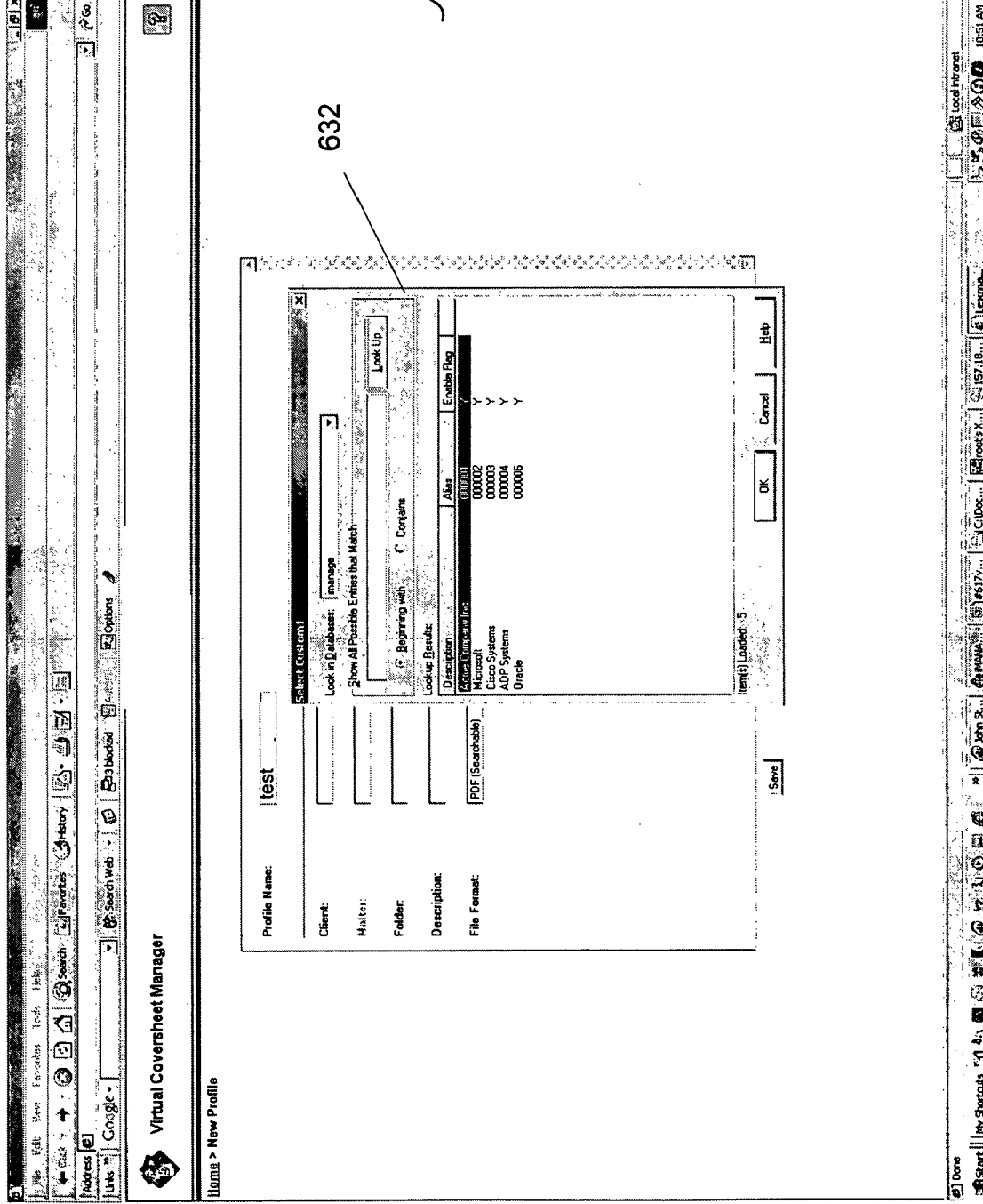
FIG. 7 is a pop-up window displayed on the third web browser screen of FIG. 6.

In some embodiments, a selection button or link 608, 614, 618, 622 may correspond to or be associated with information fields 612, 616, 620, 624, 628. For example, field 612 has a respective option button 614 to select a client number, field 616 has a respective option button 618 to select a matter number, and the folder field 620 has a respective option button 622 to select a folder directory. In this way, the user can choose from a list of options from a pop up window such as a customer pop up window 632 as shown in FIG. 7. In the embodiment shown, the customer pop up window 632 is generally managed by the local database application 148 or the server database application 124. The user can complete the information fields by clicking a respective option button or by selecting an item from the pop up windows. In other embodiments, the user can access the options via a pull down menu. For example, the file format field 628 has a respective pull-down menu 630 for selecting the file format type. It should be noted that other types of information fields and field selection processes can also be used with the new profile function. Once the user has selected or entered all of the required profile information, the user can select or click a save button 636 to save the entered information. The user may also select or click a reset button 640 to reset the entered information to their default values.

Figure 8:
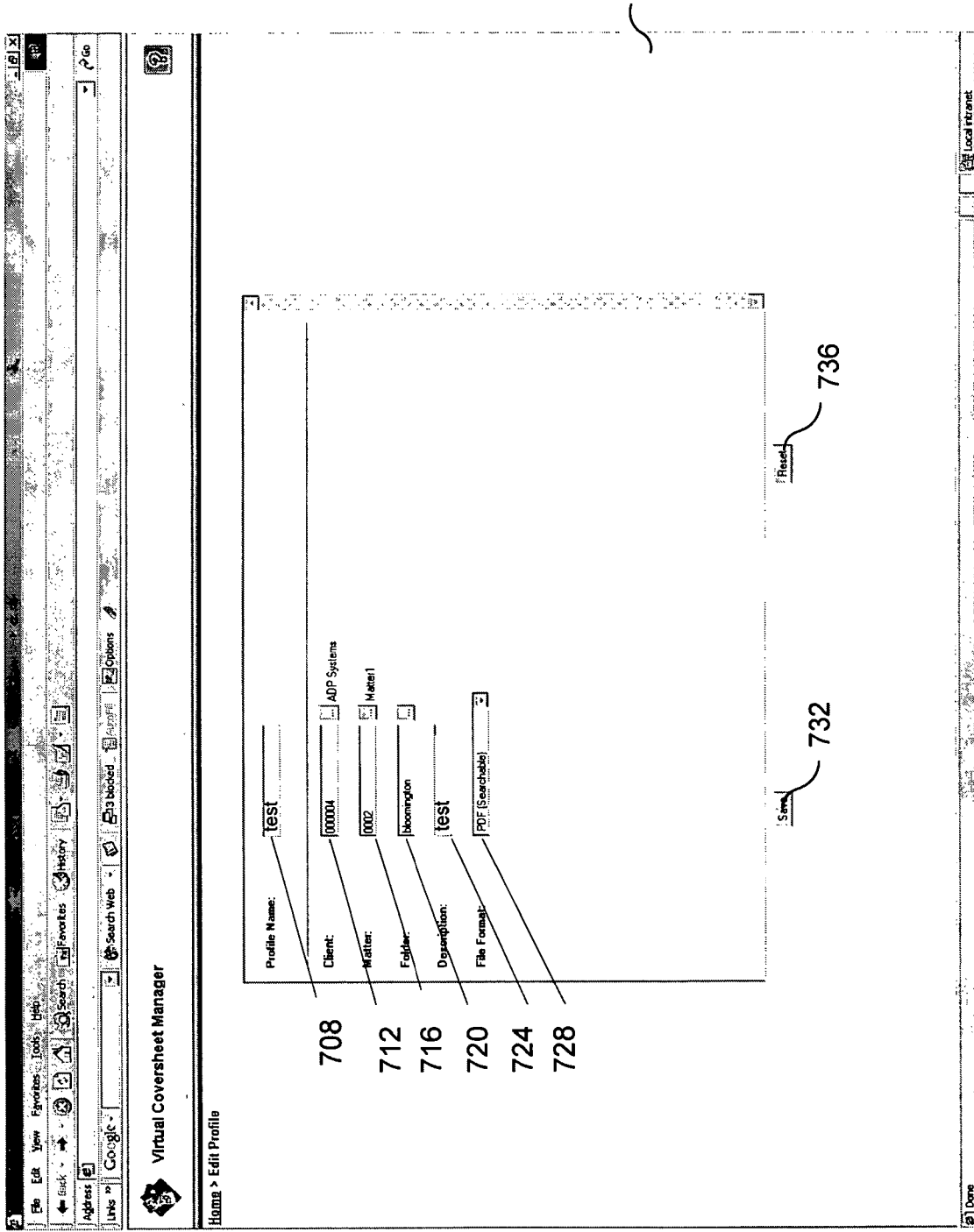
FIG. 8 is a fourth web browser screen display of the coversheet application of FIG. 3 showing an edit-profile page.

If the user has already saved some profiles in the home page 504, the user can choose to edit a particular profile using the link 516. FIG. 8 is a fourth web browser screen display 700 that includes an edit profile page 704. As shown in FIG. 8, the edit profile page 704 shows a plurality of fields including a profile name field 708, a client field 712, a matter field 716, a folder field 720, a description field 724, and a file format field 728. The entries will initially display default information or information that was originally associated with the profile name before it is edited. The user may then change any of the entries as described in FIG. 6 Once changes are made, the changes can be saved by selecting or clicking a save button 732. Once the save button 732 is clicked, the coversheet home page 504 (FIG. 5) may be displayed. The user, however, can also use or click a reset button 736 to clear all the changes made in the entries or to reset field values to the original entries. The entries 708, 712, 716, 720, 724, 728, are generally provided with options or option buttons such that the user can select from a list provided by the local database application 148 or the server database application 124. Furthermore, if the user clicks the option buttons as discussed with FIG. 6, a corresponding pop-up window may be displayed at the editing profile page 704 (FIG. 8). The user may then click the save button 732 to save the changed profile and to return to the home page 504 (FIG. 5).

Figure 9:
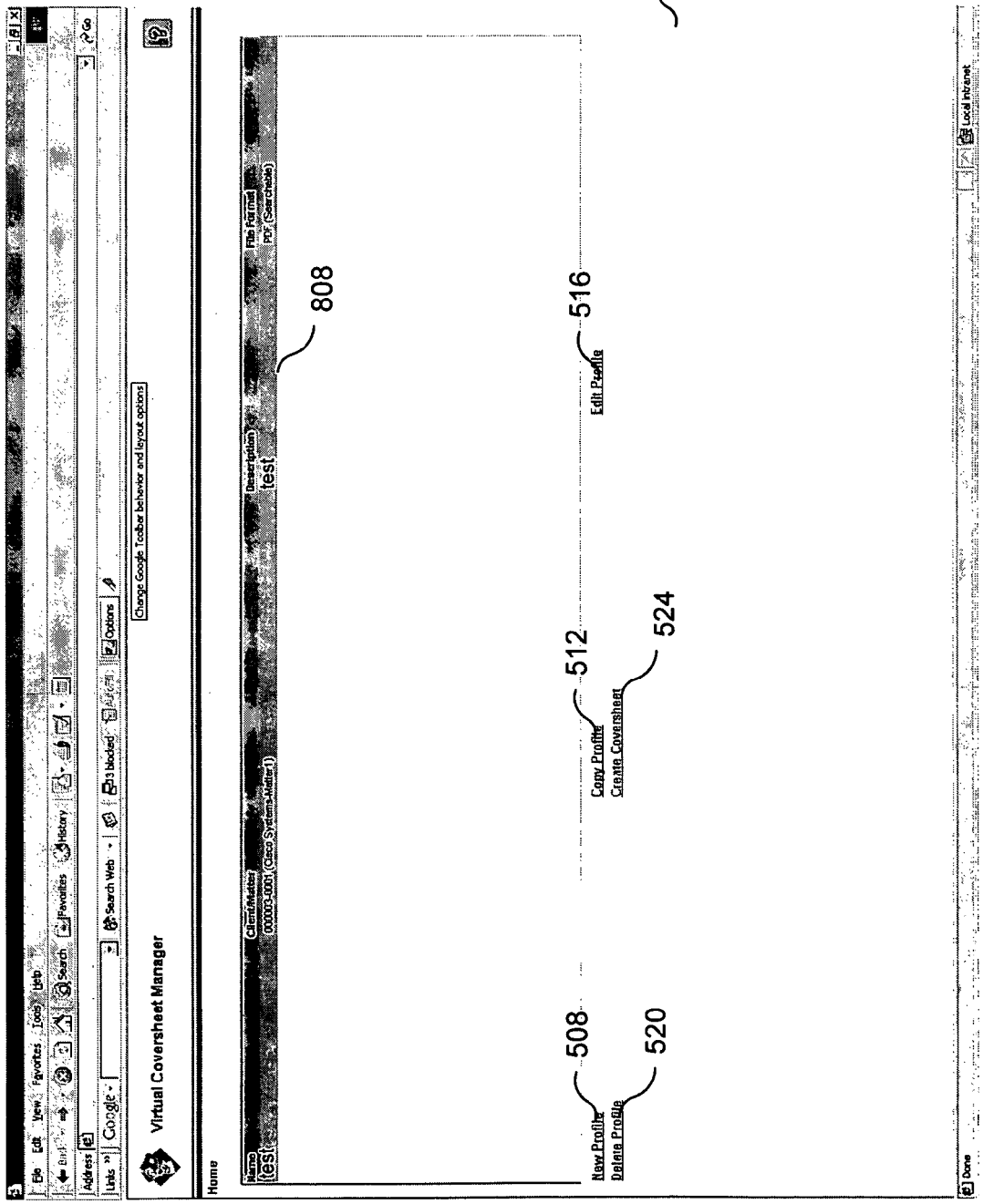
FIG. 9 is a fifth browser screen display of the coversheet application of FIG. 3 showing a second home page populated with a profile.

Referring again to FIG. 5, in addition to creating a new profile using the link 508 and editing the profile through link 516, the user can also elect to delete a particular profile via link 520 or copy a profile using link 512. To copy a profile using the link 512, the user initially selects a profile to be copied, and then clicks the link 512 to copy the selected profile. Upon doing so, a fifth browser screen display 800 (FIG. 9) appears that includes a second home page 804 populated with an existing profile 808. Once the user has selected the profile 808 by highlighting the profile 808 and clicked the link 512, a copy profile page is displayed.

Figure 10:
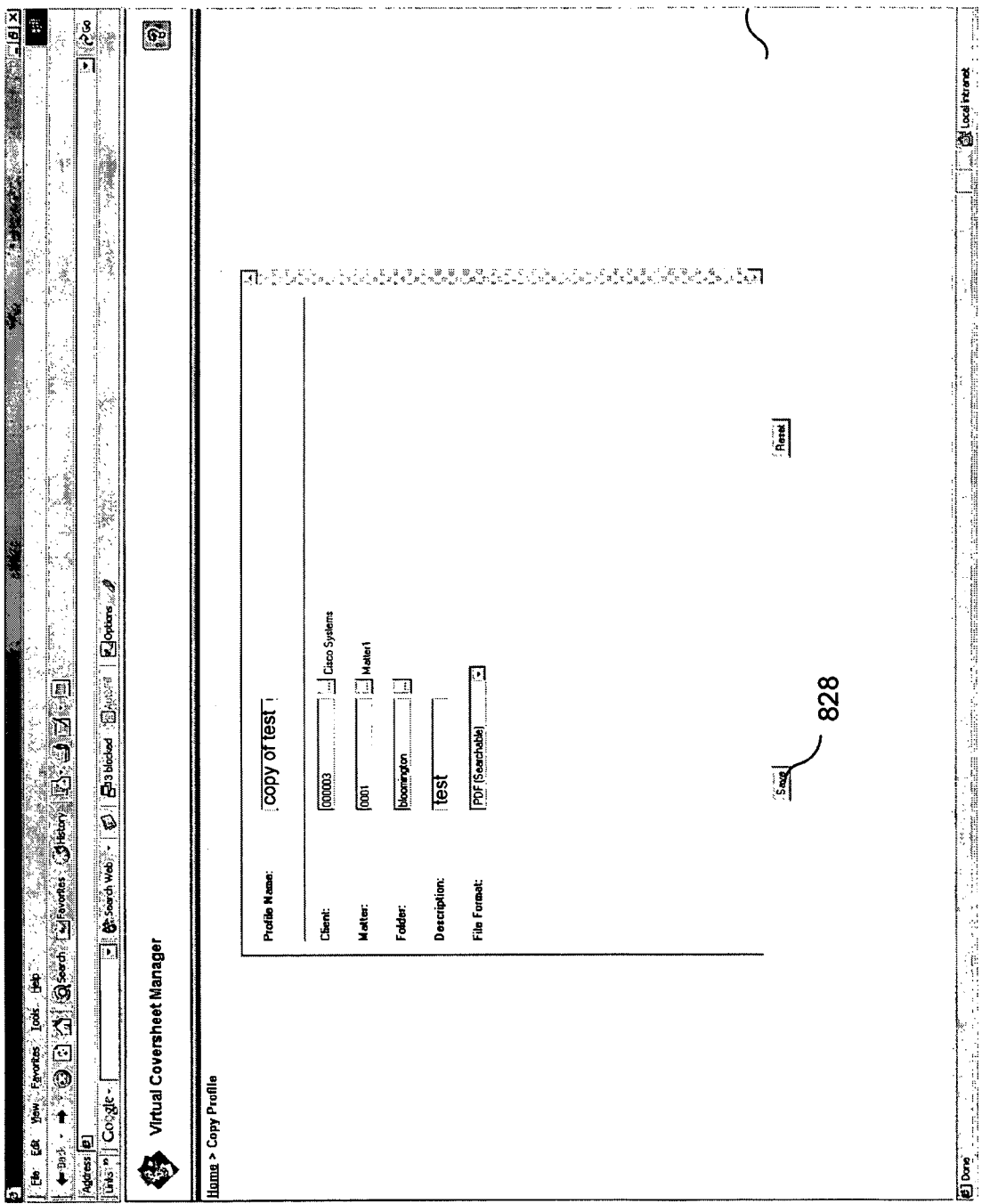
FIG. 10 is a sixth browser screen display of the coversheet application of FIG. 3 showing a copy-profile page.

FIG. 10 shows a sixth browser screen display 820 that includes a copy profile screen or page 824 that can be similar to the edit profile page 704 of FIG. 8. For example, the copy profile page 824 includes a profile name field, a client field, a matter field, a folder field, a description field, and a file format field. It should be understood that the copy profile page 824 can include other entries that are configurable by the user. Once the user has made any desired changes to the entries on copy profile page 824, the user clicks a save button 828 to save the changes, and the home screen 504 (FIG. 5) may be displayed and list a copy of the profile 808.

Figure 11:
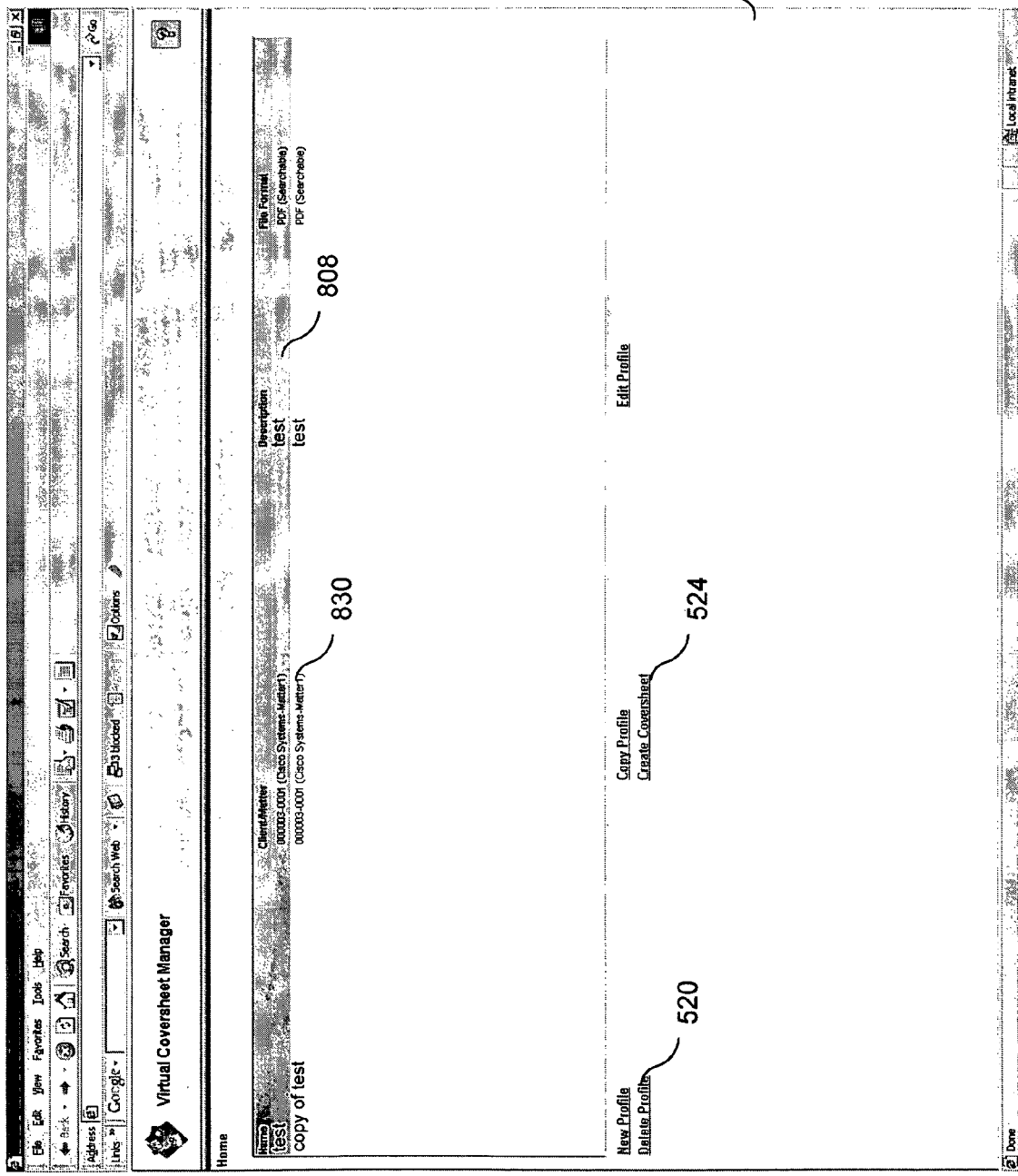
FIG. 11 is an seventh web browser screen display of the coversheet application of FIG. 3 showing a third home page populated with the profile of FIG. 8 and a copy of the profile.

FIG. 11 shows a seventh web browser screen display 832 that shows an edited or second home page 836 that lists the original profile 808 and a copy of the profile 830. As shown in FIG. 11, the user may delete a profile using the link 520 on the page 836. In some embodiments, deleting a profile using the link 520 will start a pop-up window to ensure that the user wants to delete a selected profile in a known manner. In this way, the chances of the user accidentally deleting a profile are reduced.

As described, the second home page 832 shows two profiles 808 and 830. The user is also given an option to create a coversheet using the link 524 on the second home screen page 836. The user can create a coversheet by clicking the link 524. In this way, a batch job or a repetitive job using a selected profile can be performed to improve efficiency and to reduce the time required to enter information for an individual profile. Once the user has highlighted a particular profile for the batch job, the user clicks the link 524 to create a coversheet as discussed in connection with the flowchart shown in FIG. 3. In this way, the user can reduce the time needed to individually and manually enter the information for all of the profiles at the MFD 108.

Figure 12:
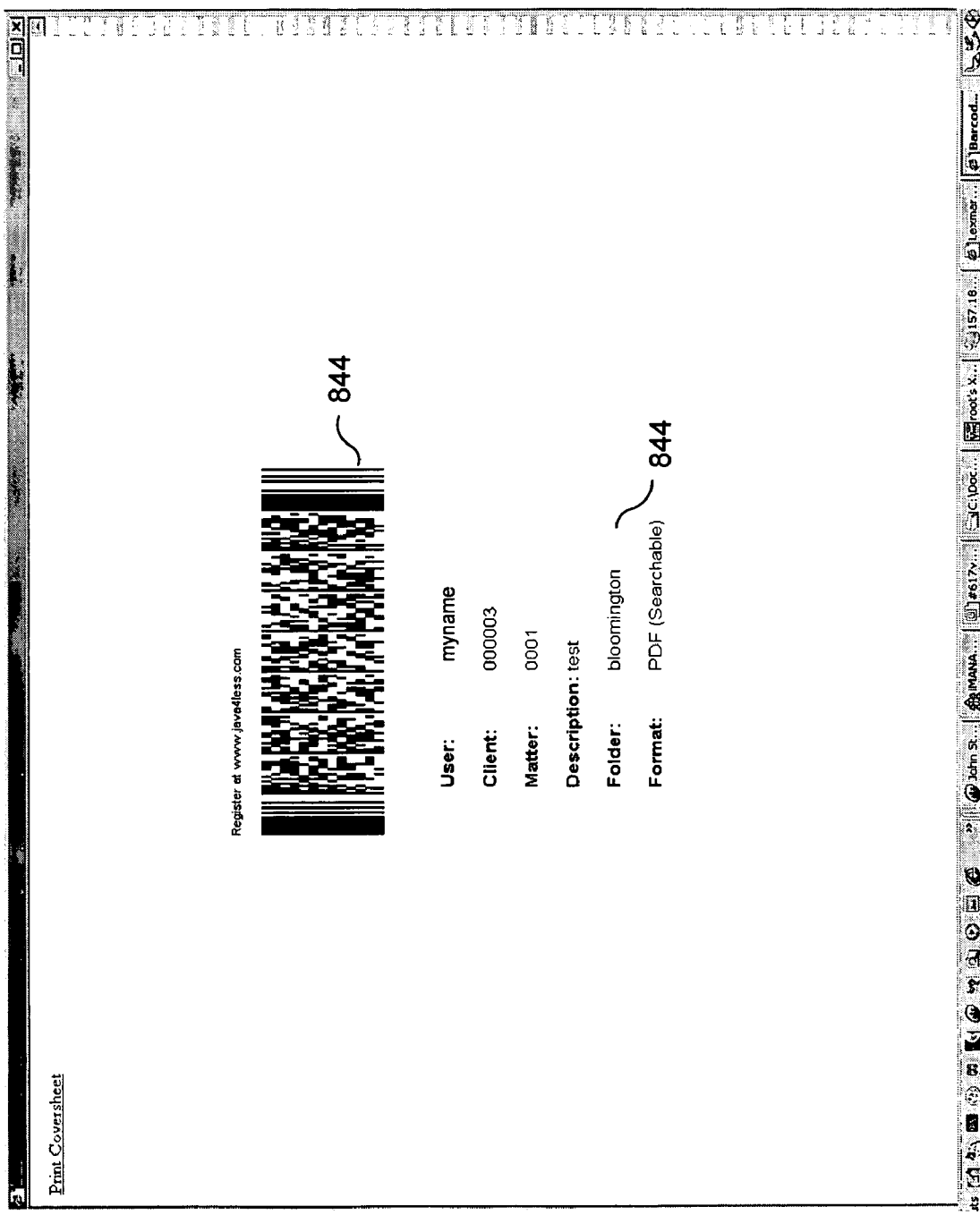
FIG. 12 is an exemplary coversheet generated by the coversheet application of FIG. 3.

FIG. 12 shows an exemplary coversheet 840 generated by the coversheet application process 300. Coversheet 840 includes identifiers 844 such as the barcode, and other profile information. In other embodiments, the identifiers can include a combination of barcodes, a string of characters, scanner and computer readable or recognizable objects such as patterns and colors or color combinations. As described, the coversheet 840 also includes the profile information inputted or selected by the user. As shown in FIG. 12, the profile information includes a name of the user, a client number, a matter number, a description of the profile, a folder, and the format of the document. As previously described with the description of FIG. 3, the system 100 can generate a virtual coversheet for use with the MFD 108.

Figure 13:
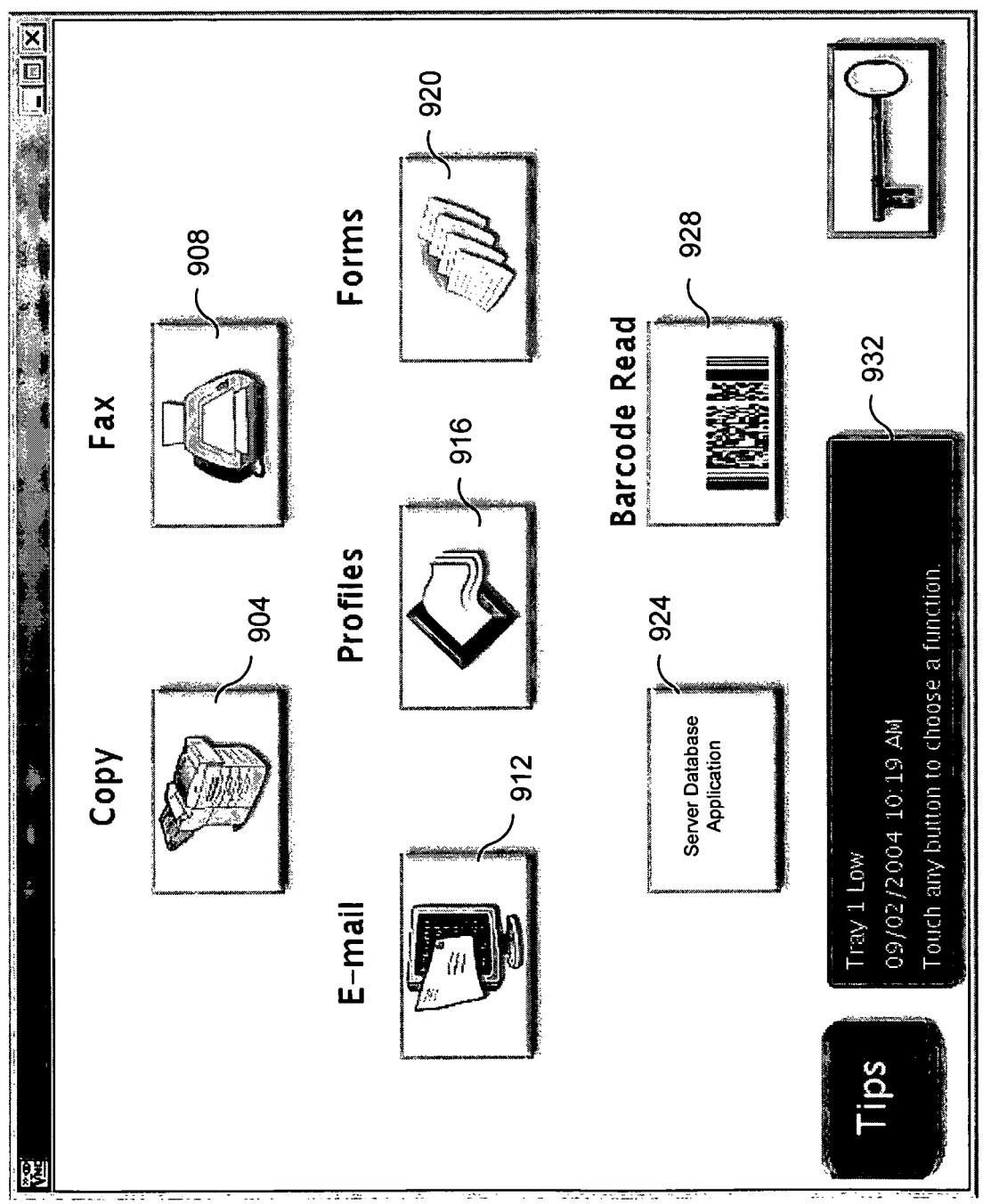
FIG. 13 is a touch screen display of the MFD of the electronic data management system of FIG. 1 showing a plurality of touch-screen options.

Once the user has finished creating the coversheet through link 524, the user can access the created profile via the touch-screen 132 at the MFD 108. FIG. 13 shows a user interface 900 displayed on a touch screen 132 on the MFD 108 of FIG. 1. The interface 900 includes soft buttons for enabling a plurality of MFD functions. The option buttons correspond to a copy function 904, effect function 908, an email function 912, a profile function 916, a forms function 920, a database application function 924 and a barcode read function 928. Other functions can also be offered on the touch screen 132. In some cases, the touch-screen 132 can also include a sub-screen to display status of the MFD 108. For example, the touch-screen 132 also includes a display area 932 that shows a status of a tray at the MFD 108.

Although the interface 900 is shown on the touch-screen 132, the interface 900 can also be displayed on a computer that is linked to the MFD 108. To access the virtually created profile using the web browser application 144, the user can select the local database application 148 or server database application 124 by selecting the server database application function option button 924. In some embodiments, once the database application function 924 has been selected, the user will go through a log-in process that may require the user to enter the user ID and/or a respective password.

Figure 14:
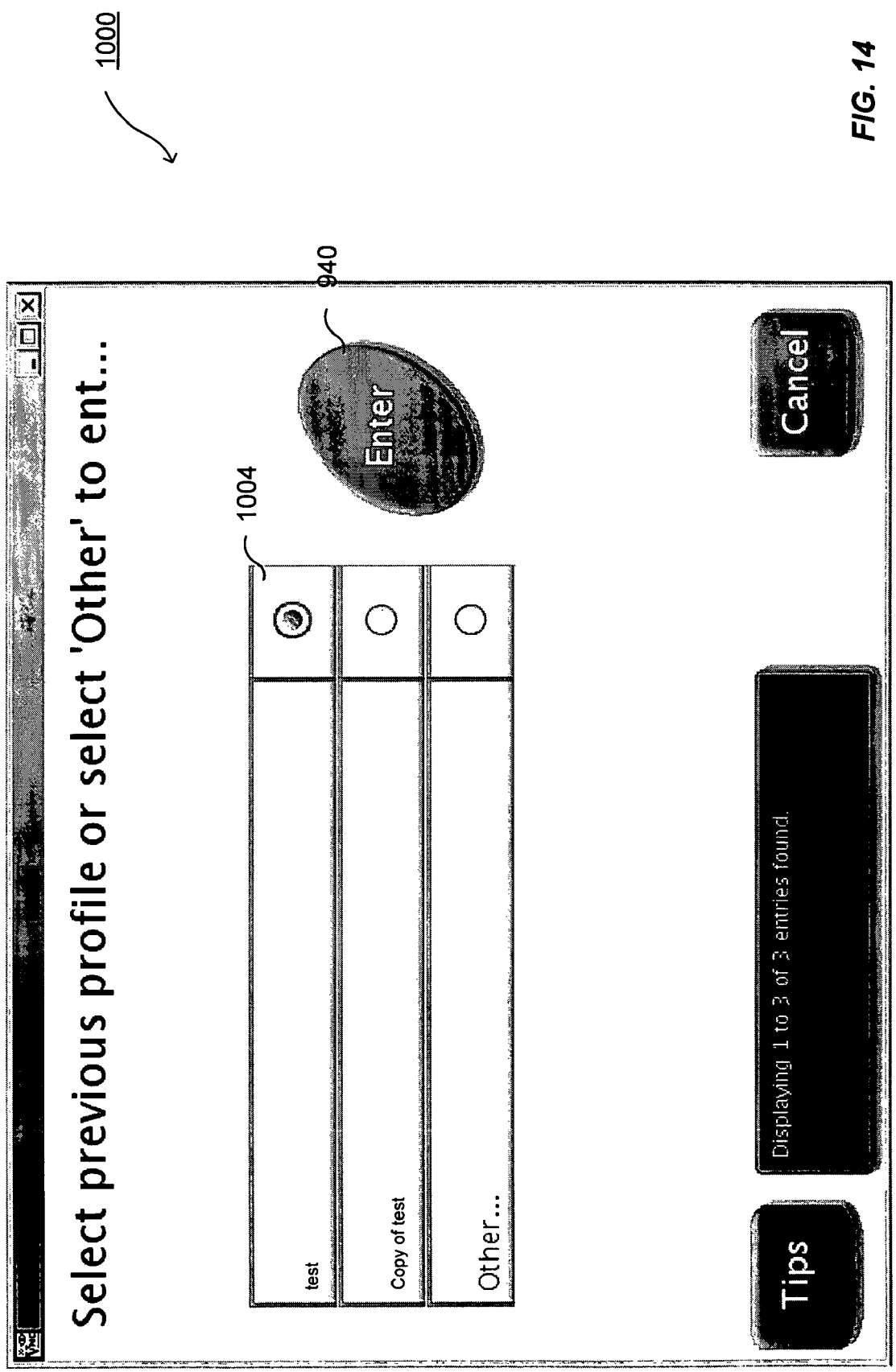
FIG. 14 is a second touch screen display of the MFD of the electronic data management system of FIG. 1 showing the profiles stored.

Once successfully logged in, the user is shown all the profiles that have been generated using the coversheet application 120 and the plug-in 144. FIG. 14 shows a second interface 1000 displayed on the touch screen after the user has selected an appropriate database application as described. The second interface 1000 shows a plurality of profile entries 1004. That is, the user selects a particular profile from the list of profiles 1004, presses a respective select soft button 936, and presses an "enter" soft button to continue.

Figure 15:
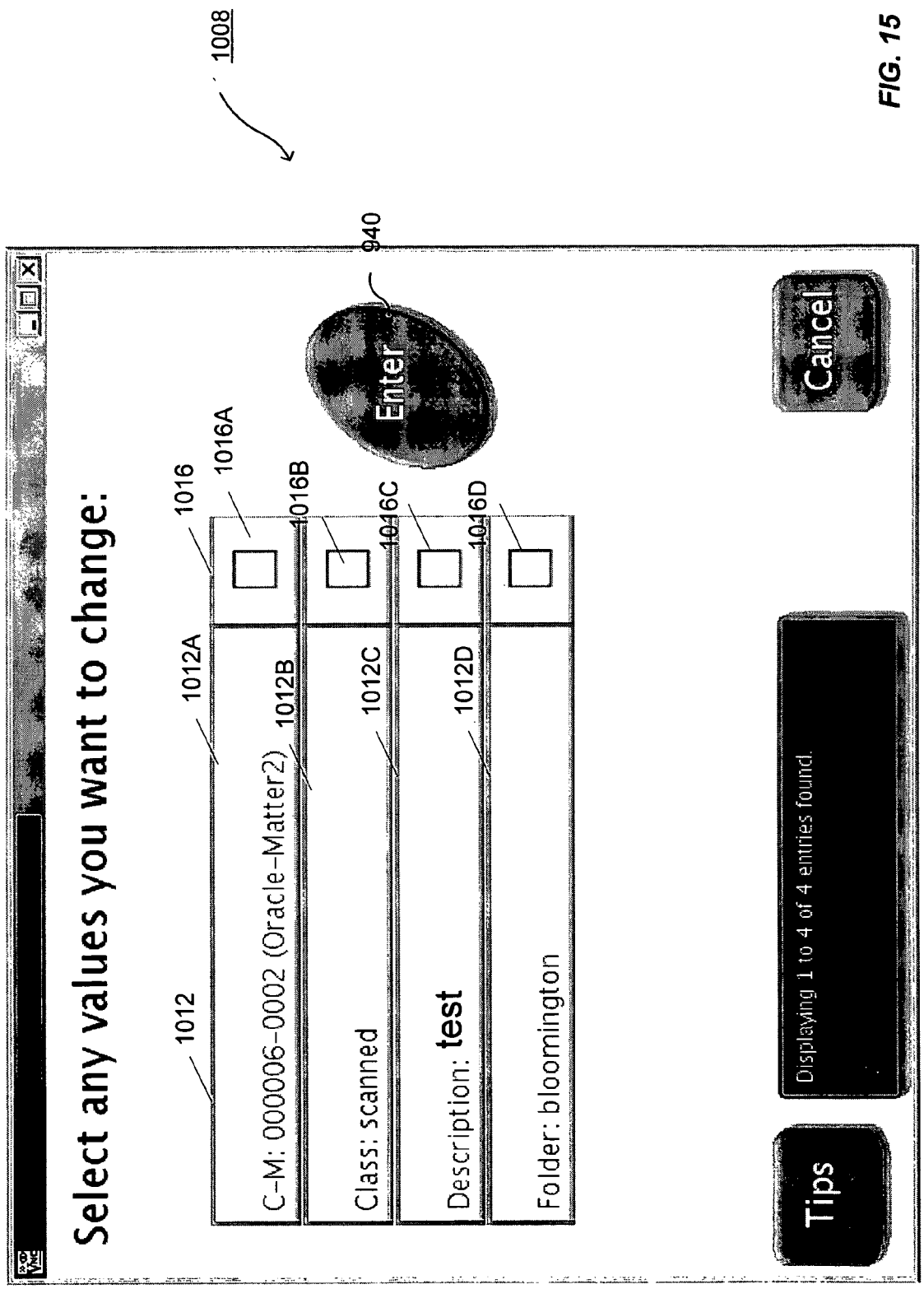
FIG. 15 is a third touch screen display of the MFD of the electronic data management system of FIG. 1 showing a plurality of screen options.

In some embodiments, the user is also provided with the information of the selected profile 1012 so that the user can edit or change the information of the selected profile 1012. FIG. 15 shows a third interface 1008 displayed on the touch screen 132 on the MFD 108 of FIG. 1. The third interface 1008 lists a plurality of fields 1012 that the user can change. Such fields correspond to the profile selected 1012 from the list of profiles displayed on the second interface 1000. For example, the user may select the profile fields to edit by checking the respective box of each of the profile fields and pressing the enter soft button 940 to continue executing the database application. In the embodiment shown in FIG. 15, client matter check box 1016A may be selected in order to modify the value of client matter field 1012A, class check box 1016B may be selected in order to allow the user to change the format 1012B of the scanned document, description check box 1016C may be selected to allow the user to change the profile description 1012C, and a folder check box 1016D may be selected to allow the user to change the folder 1012D into which the document is stored. Once the user has changed the information of the profile for a document to be scanned, the user can activate start a known scanning process by activating a scan button on the MFD 108.

In a case where the coversheet 840 (as shown in FIG. 12) has been generated, the user can stack or place the generated coversheet 840 on top (or as mentioned at another place in the stack of documents) of a document to be scanned and load the MFD 108 with the document and the coversheet 840. The user may launch the barcode read function by activating or pressing the barcode read function option button 928 of interface 900 at the MFD 108. The document with the coversheet 840 is then scanned, and stored according to the information formed on or contained in the coversheet 840. In this way, the user can skip entering a profile or editing a selected profile as discussed with FIG. 14 and FIG. 15.

In some embodiments, after the document has been scanned, the scanned document may be submitted to the local database application 148 or the server database application 124 with the profile or the metadata generated previously for storage and/or performance of other functions such as faxing, mailing, copying and printing.

Thus, the invention provides, among other things, a method and system for managing a scanned document or scanned images. Various features and advantages of the invention are set forth in the following claims.

What is claimed is:

1. A method of managing and using a profile associated with a document, the profile being one of a plurality of profiles stored in a database, the method comprising:
   accessing all of the plurality of profiles stored in the database;
   receiving a selection from a user for the profile to be associated with the document;
   generating an identifier based on the selected profile;
   printing by a printing device the identifier for use in scanning documents to be associated with the profile;
   scanning the identifier and the document;
   electronically associating the scanned document with the identifier and the selected profile;
   electronically transmitting the scanned document to the database; and
   electronically storing the scanned document at the database based on preprogrammed instructions and the associated identifier.

2. The method of claim 1, wherein generating the identifier further comprises forming at least one of a barcode, a scanner readable character, a computer readable character, and information of the profile.

3. The method of claim 1, further comprising at least one of emailing the scanned document, copying the scanned document, and printing the scanned document based on the preprogrammed instructions and the associated identifier.

4. The method of claim 1, further comprising editing the profile after printing the identifier.

5. A method of managing and using a profile associated with a document, the profile being one of a plurality of profiles stored in a database, the method comprising:
   accessing all of the plurality of profiles stored in the database;
   receiving from a user a selection for at least one of accessing an existing profile and
   creating a new profile to identify the profile to be associated with the document;
   generating an identifier based on the identified profile to be associated with the document;
   printing by a printing device the identifier for use in scanning documents to be associated with the profile;
   scanning the identifier and the document;
   electronically associating the scanned document with the identifier and the selected profile;
   electronically transmitting the scanned document to the database; and
   electronically storing the scanned document at the database based on preprogrammed instructions and the associated identifier.

6. The method of claim 5, wherein generating the identifier further comprises imaging on a sheet at least one of a barcode, a scanner readable object, a computer readable object, and information of the profile.

7. The method of claim 5, wherein the receiving from the user the selection for at least one of the accessing the existing profile and the creating the new profile further comprises at least one of creating a new profile, copying the existing profile, editing the existing profile, and deleting the existing profile.

8. The method of claim 5, further comprising at least one of emailing the scanned document, copying the scanned document, and printing the scanned document based on the preprogrammed instructions and the associated identifier.

9. The method of claim 5, further comprising the act of editing the profile after printing the identifier.

10. A system for managing and using a profile associated with a document, the profile being one of a plurality of profiles stored in a database, the system comprising:
    an application configured to access all of the plurality of profiles stored in the database, to receive a selection from a user for the profile to be associated with the document and to generate an identifier based on the selected profile;
    a device configured to print the identifier for use in scanning documents to be associated with the profile;

a scanning device configured to scan the identifier and the document; and a second application electronically associating the scanned document with the identifier and the profile; and a database managing application having a preprogrammed routing instruction including an instruction to electronically transmit the scanned document to a database and an instruction to electronically store the scanned document at the database based on the associated identifier.

11. The system of claim 10, wherein the identifier comprises at least one of a barcode, a scanner readable character, a computer readable character, and information of the profile.

12. The system of claim 6, wherein the preprogrammed routing instruction further comprises at least one of an instruction to email the scanned document, an instruction to copy the scanned document, and an instruction to print the scanned document.

13. The system of claim 11, further comprising a touchscreen application configured to access the database for the profile and to edit the profile after printing the identifier.

14. The method of claim 1, wherein the electronically associating is performed by an authorized user.

15. The method of claim 5, wherein the electronically associating is performed by an authorized user.

16. The system of claim 10, wherein the electronically associating is performed by an authorized user.

* * * * *